June 6, 1933.  S. SINGER  1,913,093
AUTOMATIC WEIGHING AND CALCULATING MACHINE
Filed Jan. 6, 1930   3 Sheets-Sheet 1

INVENTOR.
Samuel Singer
BY Munn & Co.
ATTORNEYS.

June 6, 1933.  S. SINGER  1,913,093
AUTOMATIC WEIGHING AND CALCULATING MACHINE
Filed Jan. 6, 1930  3 Sheets-Sheet 3

INVENTOR.
Samuel Singer
BY
ATTORNEYS.

Patented June 6, 1933

1,913,093

UNITED STATES PATENT OFFICE

SAMUEL SINGER, OF SAN FRANCISCO, CALIFORNIA

AUTOMATIC WEIGHING AND CALCULATING MACHINE

Application filed January 6, 1930. Serial No. 418,918.

My invention relates to improvements in automatic weighing and calculating machines, and it consists in the combinations, constructions and arrangements hereinafter described and claimed.

An object of my invention is to provide an automatic weighing and calculating machine which is an improvement over my invention on an automatic registering and calculating machine filed March 13, 1929, Serial No. 346,746.

In the present invention I show two scales and a pointer for each, these scales and pointers being in duplicate so that they may be read from either side of the machine. The weighing scale and its associate pointer is brought into actuation as soon as an article is placed upon the weighing platform. The calculating scale and the pointer associated therewith indicate the total amount of the purchase as soon as the required key is pressed.

For example, if an article weighing seven pounds is purchased and the selling price is 20¢ a pound, the article is first placed upon the weighing platform and the weighing pointer will immediately swing around to the number 7 indicating the weight. The 20¢ key is now pressed, and the calculating pointer will immediately swing around and indicate .20 × 7 or $1.40.

The device is relatively simple in construction for the work accomplished, and it will accurately determine the weight and also the amount to be paid.

Other objects and advantages will appear as the specification proceeds, and the novel features of the device will be particularly pointed out in the claims hereto annexed.

Figure 1:
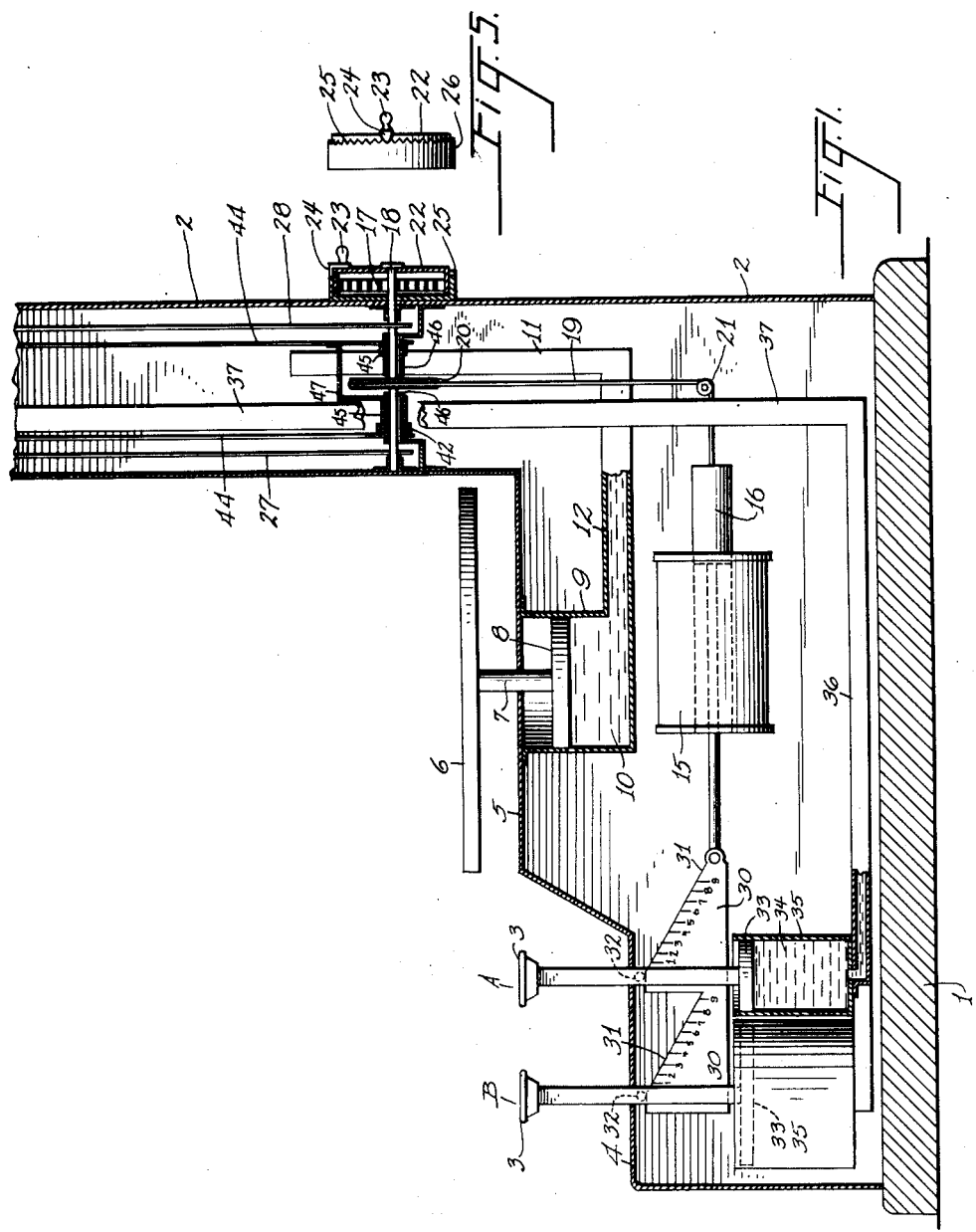
Figure 2:
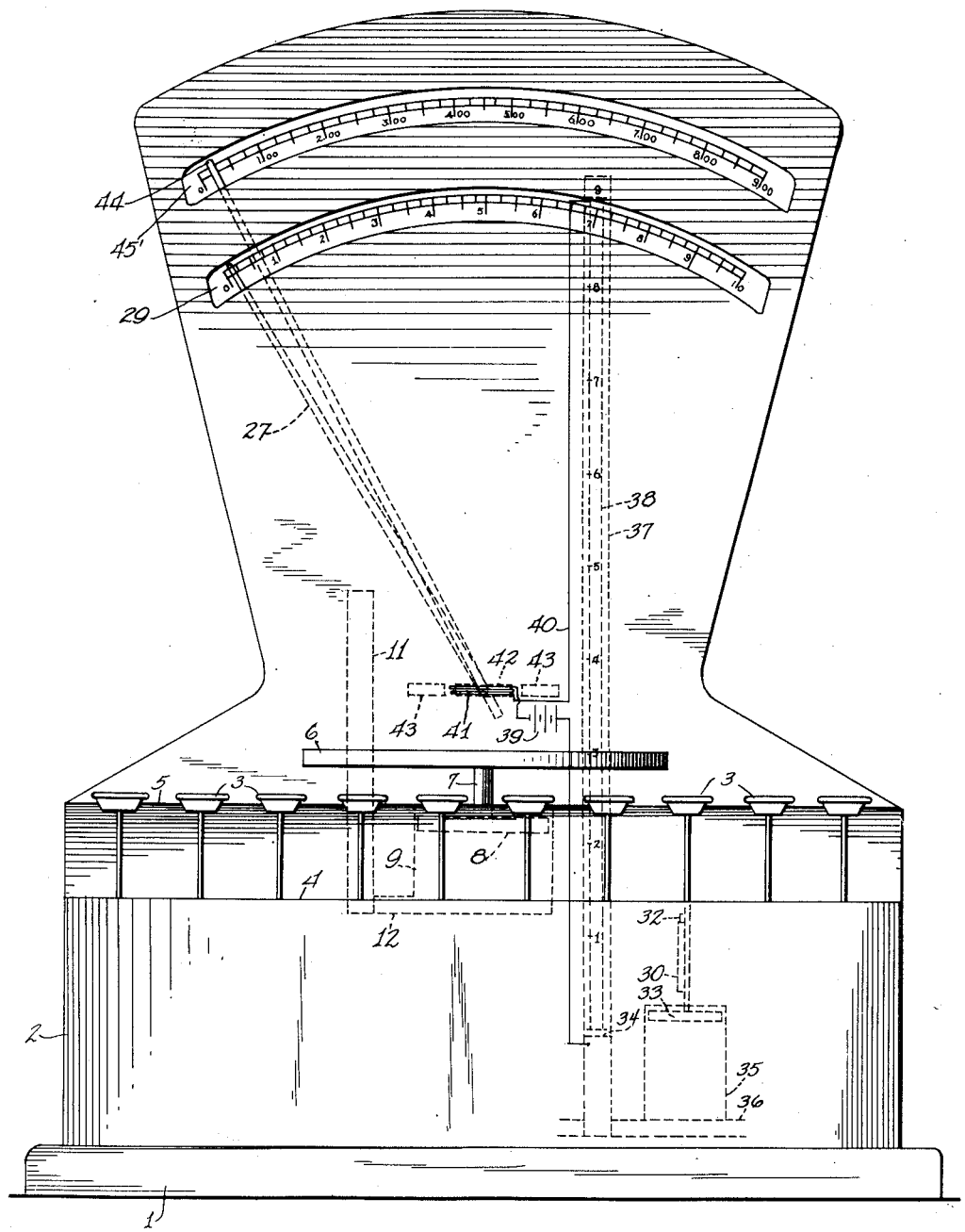
Figure 3:
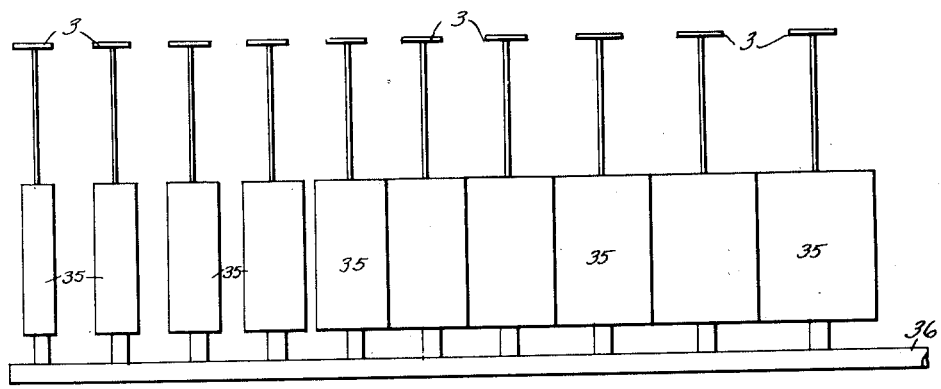
Figure 4:
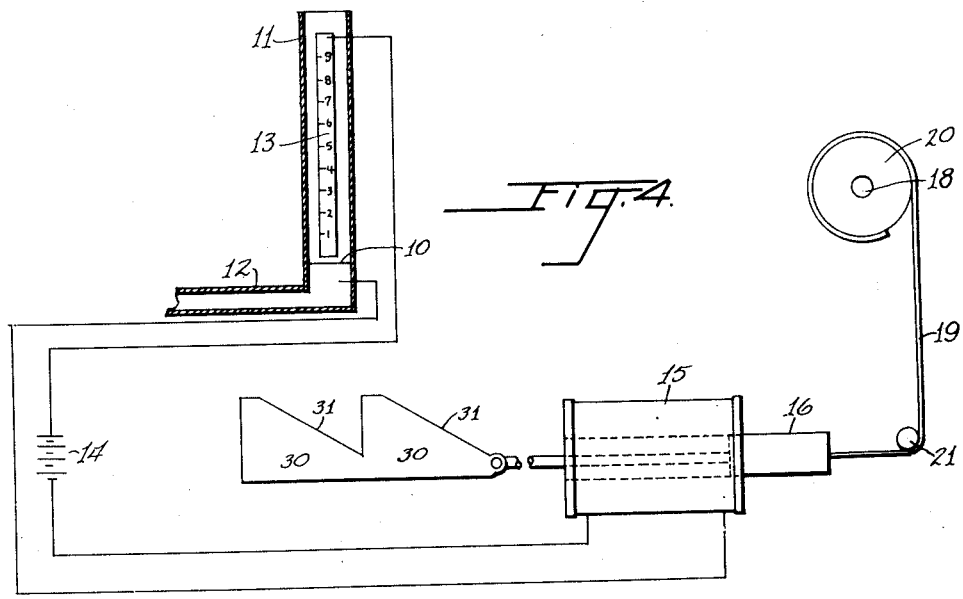

My invention is illustrated in the accompanying drawings, in which:

Figure 1 is a vertical section through the device, portions being shown in elevation, Figure 2 is a front elevation of the device, Figure 3 is a diagrammatic view of a row of keys and their associate cylinders, Figure 4 shows a wiring diagram and parts of the mechanical structure, and Figure 5 is a side elevation of a part of the device.

In carrying out my invention, I provide a support 1 upon which a casing 2 is mounted. A number of keys 3 project from a portion 4 of the casing, and these keys have different values printed thereon. I show two rows of keys, although it is obvious that as many rows as desired may be employed. The row A indicates the units keys from 1 to 9, while the row B indicates keys numbering 10, 20, 30 etc. to 90. The mechanism actuated by the keys will be hereinafter described.

On a horizontal portion 5 of the casing 2 I mount a weighing platform 6. This platform is supported by an upright 7 that in turn is carried by a piston 8. The piston is mounted in a cylinder 9 that is filled with mercury 10 or other fluid. A column 11 (see Figure 1) for holding mercury is connected with the cylinder 9 by means of a passageway 12, and the mercury in this column is raised in direct proportion to the movement of the piston 8 downwardly in the cylinder 9. The movement of the piston 8 is caused by a weight being placed upon the platform 6.

Referring to Figure 4, it will be seen that an electrical resistance 13 is mounted in the tube 11 and that this resistance is divided into nine units. The mercury 10 is substantially at the level shown in Figure 4 when the platform 6 is supporting no weight. If an article weighing seven pounds, for example, is placed upon the platform 6, the piston 8 will be moved downwardly a distance sufficient to drive the column of mercury 10 up into the tube 11 so as to register with the number 7 on the resistance 13.

As soon as the mercury 10 touches the resistance 13, an electric circuit is closed from a source of current 14 to a solenoid 15. The strength of the current is directly in proportion to the amount of resistance 13 in the circuit. If the mercury has reached the number 7, as already stated, the current is strong enough to cause the solenoid 15 to pull a core 16 into the bore of the solenoid and against the tension of a spring 17 shown in Figure 1. I have shown a coil spring 17 connected to a shaft 18 and tending to rotate the shaft so as to wind a cable 19 around a pulley 20. This cable 19 is passed over an idler 21 and is connected to the core 16.

It will be seen from this that the core 16 will be moved into the solenoid 15 until the electrical force exerted on the core will be counter-balanced by the force of the spring 17. I show means for adjusting the tension of the spring to the desired amount. In Figure 1 it will be noted that one end of the spring is secured to the shaft 18 while the other end is secured to a rotatable cover 22. This cover has a handle 23, and this handle has a pawl 24 that is designed to enter any one of a number of serrations 25 in the peripheral edge of a spring housing 26. The handle 23 may be manually adjusted for winding or unwinding the spring 17 to the desired extent. The spring tends to hold the pawl 24 in the desired position in the ratchet teeth 25.

The rotation of the shaft 18 will carry with it two weight-indicating pointers 27 and 28. These are mounted upon the shaft as shown in Figure 1, and are designed to move over a weight-indicating scale 29 shown in Figure 2. The pointer 27 is readable from the front of the machine, while the rear pointer 28 is readable from the back of the machine. If a seven pound article has been placed upon the platform 6, the shaft 18 will be rotated until the pointers 27 and 28 stop opposite the number 7 on the scale 29.

The moving of the core 16 also moves a set of inclined members 30 (see Figure 1). There is a member 30 for each key 3, and all of the members are moved as a unit by the core 16. The inclined edges 31 are divided into nine equal parts, and should a seven pound article be placed upon the platform 6, all of the members 30 will be moved to the left in Figure 1 until the numbers 7 on these members are positioned directly below the key heads. This will permit any one of the keys to be moved downwardly until the stop 32 carried by the key shank strikes its associate inclined edge 31 at the point 7. The operator will be able to sense the contacting of the stops 32 with the edges 31, and will therefore stop depressing the keys to a further degree. The slope of these edges is so designed as to prevent a cam action when the stops 32 strike the edges. If the key depressed is in the units row and this key is numbered 3, a piston 33 connected with the key will displace three units of mercury 34 from a cylinder 35 (see Figure 1) for each unit distance the piston is moved downwardly in the cylinder. If the piston is moved downwardly seven units, 7×3 units of mercury or 21 units will be forced from the cylinder 35.

The same is true for any other key. If the 20 key, for example, were depressed, each unit of movement would displace twenty units of mercury. If the key were depressed seven units or until the stop 32 struck the inclined edge 31, 7×20 units of mercury would be expelled, making a total of 140 units. It will be seen from this that the weight of the article upon the platform 6 determines one factor of the product. The other factor of the product is determined by the key depressed.

All of the cylinders 35 are connected to a common passageway 36, and this passageway communicates with a mercury column 37. I have shown this column 37 in Figure 2, and it will be noted that it carries an electrical resistance 38 that is divided into nine parts. It is obvious that this resistance may be divided into any number of equal parts desired, and in the same way the resistance 13 may be divided into any number of equal parts. The present machine is designed to weigh up to ten pounds and to calculate up to $9.00. Larger machines may be constructed for weighing articles in excess of ten pounds, and these machines will operate on the same principle as that disclosed in the present case.

The mercury 34 will rise in the tube 37 and will close an electric circuit from a source of current indicated at 39 (see Figure 2), the circuit being closed as soon as the mercury contacts with the resistance 38. The strength of the current will be proportional to the amount of resistance in the circuit. If a seven pound article is on the platform 6 and the key numbered 20 is depressed, 140 units of mercury will be forced up into the column 37 and the level of the mercury will be substantially half way between the 1 and 2 markings on the resistance 38. The current from the battery 39 or other source of electric current will flow through the circuit indicated generally at 40 and through a winding 41 on an armature 42. The armature is rotatably mounted between magnets 43, and it will swing itself against the tension of a spring (not shown) until the spring balances the force of the current flowing through the winding. The armature will then come to rest, and if 140 units of mercury are in the column 37, a pointer 44 connected to the armature will stop at a position opposite the $1.40 mark on a dial 45'. I have shown two pointers 44 so that the calculations may be read from either side of the machine.

In Figure 1, I show both pointers mounted upon sleeves 45, these sleeves in turn being rotatably mounted on bearings 46. The bearings enclose the shaft 18. The armature 42 is connected to one of the pointers 44, and since both pointers are connected together by an arm 47, the movement of the armature will swing both of them simultaneously.

From the foregoing description of the various parts of the device, the operation thereof may be readily understood.

In Figure 3, I show one row of keys 3 and illustrate how the cylinders 35 vary in diameter so as to cause each key to force the required amount of mercury into the passageway 36. The pointer 27 will instantly move as soon as a weight is placed upon the platform 6, and this pointer will indicate the weight of the article. The calculation of the amount of the purchase will be given as soon as the required key 3 is depressed, and this will take place in the manner already described.

As soon as the operation is completed, the mercury 10 will return the platform to normal position and the spring 17 will return the core 16 to normal position and will rotate the shaft 18 for bringing the pointers 27 and 28 back to a zero reading. The key depressed will be returned to normal position by the mercury flowing from the column 37 back into the cylinder 35 associated with the key due to the fact that the mercury will seek its own level. The machine is now ready for the next operation.

Although I have shown and described one embodiment of my invention, it is to be understood that the same is susceptible of various changes, and I reserve the right to employ such changes as may come within the scope of the invention as claimed.

I claim:

1. In a calculating machine, a reservoir for an electrical conducting fluid, a plurality of cylinders connected to the reservoir and being of predetermined diameters, a piston mounted in each cylinder, said pistons delivering different predetermined quantities of fluid to the reservoir when moved through the same distance, a member for each piston for limiting its movement, and means for simultaneously adjusting all of the members for changing the stroke of the pistons.

2. A weighing and calculating machine comprising a weighing mechanism including a weighing platform, and adjustable stopping members movable in accordance with the weight indicated, a calculating mechanism including an electrical conducting fluid reservoir, an electrical resistance mounted therein, an electrically actuated product indicating pointer electrically connected in series with the resistance, and manually controlled keys for moving predetermined quantities of fluid into the reservoir, said adjustable stops determining the extent of movement of said keys for any given time.

3. In a calculating device, a fluid body, a key-operated member active thereon for displacing a part thereof, and weight-operated means for controlling the key movement.

Signed at San Francisco in the county of San Francisco and State of California this 28th day of December A. D. 1929.

SAMUEL SINGER.